(12) United States Patent
Griffith

(10) Patent No.: US 6,468,129 B1
(45) Date of Patent: Oct. 22, 2002

(54) BEEHIVE BOTTOM BOARD FOR REDUCING PARASITE INFESTATION

(76) Inventor: Granville Griffith, 233 Blossom La., Southgate, KY (US) 41071

( * ) Notice: Subject to any disclaimer, the term of this patent is extended or adjusted under 35 U.S.C. 154(b) by 0 days.

(21) Appl. No.: 09/517,647

(22) Filed: Mar. 3, 2000

(51) Int. Cl.[7] ............................................. A01K 47/06
(52) U.S. Cl. ............................................. 449/3; 449/20
(58) Field of Search ................................. 449/3, 16, 18, 449/19, 20, 26, 33

(56) References Cited

U.S. PATENT DOCUMENTS

| | | | |
|---|---|---|---|
| 4,299,816 A | 11/1981 | Polyakov | 424/45 |
| 4,682,380 A | 7/1987 | Martin | 449/2 |
| 4,739,531 A | 4/1988 | Robson | 449/47 |
| 4,867,731 A | 9/1989 | Willard et al. | 449/2 |
| 4,876,265 A | 10/1989 | Schmid | 514/370 |
| 4,965,287 A | 10/1990 | Stendel et al. | 514/531 |
| 5,069,651 A | 12/1991 | Aradt | 449/2 |
| 5,162,014 A | 11/1992 | Moore et al. | 449/2 |
| 5,737,870 A | 4/1998 | Thind | 43/107 |

FOREIGN PATENT DOCUMENTS

| | | | | |
|---|---|---|---|---|
| DE | 3643872 | * | 6/1988 | 449/3 |
| FR | 2612738 | * | 9/1988 | 449/3 |
| SU | 1289434 | * | 2/1987 | 449/26 |

OTHER PUBLICATIONS

Advertisement in Dadant 2000 catalog, p. 19, dated May, 2000.

Advertisement in Betterbee 2000 catalog, p. 18, received Mar. 2, 2000.

* cited by examiner

Primary Examiner—Robert P. Swiatek
(74) Attorney, Agent, or Firm—R. Christian Macke

(57) ABSTRACT

A beehive having a bottom board for separating mites from bees working in the beehive. A permanently installed screen in the bottom board separates mites from the bees, and a sticky sub-board below the screen traps the mites to prevent re-infestation. Notched members around the perimeter of the sticky sub-board prevent bees from climbing up into the beehive and prevent re-attachment. The sticky sub-board is accessible from the rear of the beehive so that the entry and exit of the bees into and out of the beehive are not disturbed.

12 Claims, 5 Drawing Sheets

BEEHIVE BOTTOM BOARD FOR REDUCING PARASITE INFESTATION

FIELD OF THE INVENTION

This invention relates to a bottom board for a bee cultivation apparatus having provisions for safely and unobtrusively removing parasite infestation.

BACKGROUND OF THE INVENTION

The cultivation of bees is well known as a means for the commercial production of honey, as well as a hobby for many, including children interested in learning about the hierarchy and work production of bees.

In general, a beehive maintained either commercially or by a hobbyist comprises a box in which bees build a honeycomb in which the honey that they produce is stored. For purposes of this application, the manufactured box in which the bees form the honeycomb will be referred to as the beehive.

The beehive generally has a fixed top and bottom and includes an exclusion device to keep the queen bee isolated. A bottom board is a generally rectangularly shaped box or frame upon which the rest of the beehive is stacked which allows bees to enter and exit the beehive while keeping out other insects, mice, and other rodents. The bottom board includes a gap on or in one of the four upstanding walls through which bees enter and exit the beehive.

The upper elements of a beehive include vertical panels mounted in at least one box like chamber. Bees work to build a honeycomb on the vertical panels and fill the honeycomb with honey. The operator of the hive then removes the vertical panel and accesses and removes honey from the honeycomb.

Prior to the present invention, the bottom board of a beehive was essentially as shown in U.S. Pat. No. 4,682,380 to Martin. The bottom board comprised a flat board at its base with three upstanding walls to support the remainder of the beehive. A gap is provided between two of the upstanding walls to provide access for the bees to enter and exit the beehive. To restrict access into and out of the beehive, it is well known to limit the size of the gap to keep out other larger insects, as well as mice and other rodents. A typical solution has been to provide a bottom board having a fourth upstanding wall that bridges the gap between the two upstanding walls, and providing a small opening or openings in the fourth upstanding wall through which bees enter and exit the beehive.

In 1987 the problem of VARROA mite infestation of bees in North America became apparent. A VARROA mite is an external parasite which attaches itself to a bee and reproduces and quickly spreads to other bees in the beehive. The problem presented by VARROA mite infestation is significant because, if the mites go untreated, an entire culture of bees can be eliminated within two years. A number of devices and methods have been developed and implemented to detect and eliminate VARROA mites to sustain the health of the bees that may otherwise fall victim to infestation.

The VARROA mites, as an external parasite of bees, are prone to fall off the bees, a characteristic that allows easy detection of infestation. It is common to find VARROA mites on the bottom board of a beehive after infestation has occurred, those mites falling off the bees as they were inside the beehive. U.S. Pat. No. 4,867,731 utilizes this characteristic of the VARROA mite to determine the presence or absence of VARROA mite infestation. The '731 patent specifically comprises an insert which slides through an access opening and is placed on the bottom board of a beehive. The '731 insert includes a sticky trapping surface that is positioned under a fine mesh screen. After the '731 device is inserted into the beehive mites that fall off bees in the beehive while over the fine mesh screen fall through the screen and onto the sticky trapping surface. The screen is such that it will permit VARROA mites to pass through while keeping bees from passing therethrough. When the VARROA mites contact the sticky trapping surface they are essentially rendered immobile to prevent reattachment or reinfestation by the mites.

The '731 device has a number of disadvantages. First, the fine mesh screen is mounted on an insert frame so, around the perimeter of the screen there is a safe landing surface comprising the frame members on which mites can safely fall without contacting the sticky trapping surface and from which they can scale the walls and reattach to and reinfest the bees. Second, the '731 insert is installed and removed through the same access opening through which bees enter and exit the beehive. This is disadvantageous because it is intrusive to the bees and negatively affects their production. Installing and removing the '731 device at the access opening utilized by the bees is also disadvantageous because, particularly for hobbyists, novices and children who maintain a beehive, a much greater risk of being stung by one of the bees is created. Third, the '731 is disadvantageous because the positioning and nature of the trapping surface are flawless as a means for trapping the mites. Specifically, if the mite falls through the screen but not onto the trapping surface, or if a mite falls upon other debris already on the trapping surface, the mite will not be stuck and can scale the walls of the bottom board and reattach to a bee.

There is thus identified a need for a beehive construction incorporating a mite trapping device that may be installed and removed without interfering with bees entering and exiting the beehive and which eliminates the safe landing areas for mites that fall off the bees while in the beehive, and which includes provisions to keep mites that fall onto the sticky trapping surface from getting to the walls and scaling the walls to reattach to the bees in the beehive.

OBJECTS OF THE INVENTION

It is an object of the present invention to provide a beehive having a mite trapping device that aids in the elimination of VARROA mites without increasing the risk to the operator of being stung.

It is another object of the present invention to provide a beehive having mite trapping provisions that is unobtrusive to bees working in the beehive.

It is yet another object of the present invention to provide a beehive with mite trapping provisions comprising a sticky board that is accessible from the rear of the beehive.

It is a further object of the present invention to provide a beehive having a screen permanently built into and covering the entire area enclosed by the upstanding walls of the bottom board.

It is a further object of the present invention to provide a beehive having a sticky sub-board that is readily accessible from the beehive to remove mites stuck thereto without interfering with bees entering and exiting the beehive.

It is yet another object of the present invention to provide a sticky sub-board for a beehive having perimeter enclosing means preventing mites from reattaching and reinfesting bees in the beehive.

It is another object of the present invention to provide a beehive having a bottom board that remains functional during removal, maintenance and replacement of a sticky sub-board received therein.

It is a further object of the present invention to provide a beehive having a bottom board that does not necessitate a solid bottom to keep separate parasites from bees in the beehive while keeping vermin from entering 'said beehive.

These and other objects and advantages of the present invention will be apparent from a review of the following specification and accompanying drawings.

SUMMARY OF THE INVENTION

The present invention comprises a beehive, specifically the bottom board of a beehive, that has a screen permanently installed in it. The bottom board of the present invention comprises upstanding walls, and the screen permanently installed in the bottom board covers the full expanse between the upstanding walls. By permanently installing the screen such that it extends from wall to wall of the bottom board, there are no areas for the mites to land around the perimeter of the screen which would allow mites to avoid passing through the screen.

The preferred embodiment of the present invention also comprises a removable sub-board that is removable from the bottom board through a rear access means. The sub-board is positioned below the screen which is permanently installed in the bottom board so that, when the sub-board is installed in the bottom board, mites will pass through the screen and land on the sub-board. In a critical feature of the present invention, the sub-board is accessible through a rear access means that is installed opposite to the front wall of the bottom board, the bees entering the beehive through slots in the front wall. This is a distinguishing feature of the present invention because it allows for removal and replacement of the sub-board with minimal intrusion on the bees which necessarily minimizes, the risk of being stung.

The rear access means for the sub-board comprises a slot in the rear wall and slots in the side walls in which the sub-board is free to slide in and out. In the most preferred embodiment of the present invention the sub-board is covered with a sticky substance to create a sticky sub-board that acts as a trap for mites. The sticky substance holds the parasite and prevents reattachment to a bee in the beehive.

The sticky sub-board of the present invention has an additional feature to prevent reattachment and re-infestation of the mites into the bees. A perimeter enclosing means around the perimeter of the sticky sub-board ensures that any mites that fall onto the sticky sub-board cannot be reintroduced onto bees into the beehive because a perimeter rim is formed on the top of the sub-board by a front member, two side members and a rear member. For sticky sub-boards having a perimeter rim, the bottom board is modified to provide larger slots to accommodate the rim members of the thicker sub-board. The perimeter members of the sub-board are sized so that those members are always recessed within the slots in the rear wall, side walls and front wall to avoid the creation of any surfaces upon which mites could land from which they could scale the walls to reinfest the bees. The perimeter members are notched near the sub-board and the notch filled with a sticky substance that precludes their movement, to keep the mites from being able to get off the sticky substance and get to a wall that they could scale and reattach to a bee.

The present invention provides a bottom board for a beehive that incorporates changes made to make the treatment of mite problems safer for the user and which improve the effectiveness of the mite eradication therefrom. A permanently installed screen that covers the entire bottom board is advantageous because there is no rim or framework onto which mites can land from which they could scale the walls and re-infest the bees in the beehive. A sticky sub-board is provided that is accessible through the rear of the beehive to keep the user away from the bees going into and out of the beehive. In a further detailed element of the preferred embodiment of the present invention, the sticky sub-board has notched rim members that allow a trapping substance to be installed in the notches. The placement of the sticky substance creates a perimeter around the sticky sub-board that mites will not be able to bridge.

DETAILED DESCRIPTION OF THE INVENTION

Figure 1:
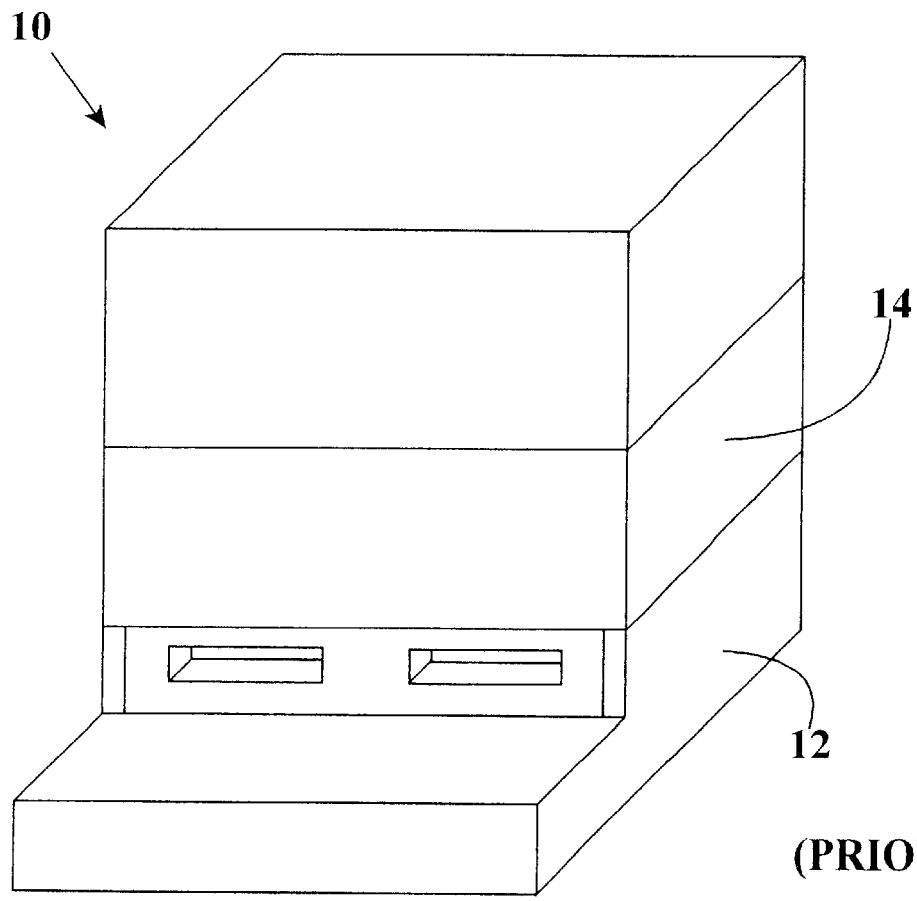
FIG. 1 is a perspective view of a beehive having a bottom board.

The present invention comprises a beehive 10, which is a multi-component box structure such as that shown in FIG. 1. Both prior art devices and the present invention include the structure shown in FIG. 1, specifically a bottom board 12 on which multiple components are stacked, such as a brood chamber 14 where bees build a honeycomb and store honey. Additional components such as a queen excluder, honey super chamber, top screen, etc. are also stacked on the bottom board 121 The present invention is directed solely to the development of the bottom board 12. No changes or additions to the elements stacked on top of the bottom board 12 are contemplated by the principles of the present invention, and no developments or distinguishing features of the brood chamber 14 or other upper elements shall not constitute a deviation from the principles of the principle invention.

Figure 2:
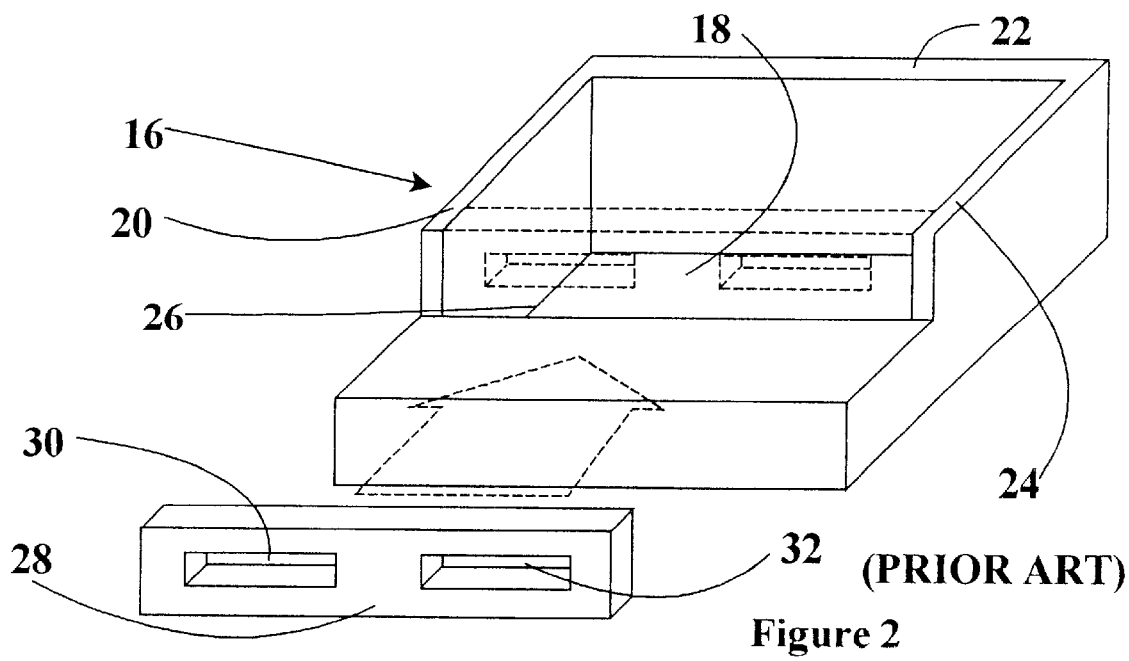
FIG. 2 is perspective view of a prior art bottom board with entrance reducer board.

FIG. 2 depicts a prior art bottom board 16 having a solid bottom plate 18, two upstanding side walls 20,24 and an upstanding rear wall 22. A gap 26 between upstanding side wall 20 and upstanding side wall 24 provides access means for bees to enter and exit the beehive 10. It is well known in the prior art to provide an entrance reducer board 28 having a slot or slots 30,32 which limit the size of the access means into, the beehive 10. The entrance reducer board 28 typically comprises a removable board 28 having slots 30,32 that is sized to fit into gap .26 between the upstanding side wall 20 and upstanding side wall 24. Entrance reducer board 28 is designed to allow access for bees into and out of the beehive 10 while sufficiently restricting the opening to keep out vermin, such as mice and other animals. Entrance reducer board 28 is removable with prior art devices so that the user of the beehive 10 can gain access into the beehive without disassembly or unstacking of the upper elements of the beehive 10.

The infestation of bees by parasites, specifically the VARROA mite, has created a need to improve the prior art bottom board 16. Once infestation of a swarm of bees by VARROA mites occurs, the entire swarm is at risk. The entire swarm can be eliminated within two years of first infestation occurs. As such, it is desirable to provide a beehive structure that eliminates or reduces the incidence and effect of VARROA mite infestation. Notwithstanding such, the principles of the present invention may be employed as an isolation or separation device for any parasite or impurity that falls off naturally within the beehive 10 to the bottom of the beehive 10 onto the bottom board 12.

An objective of the bottom board 50 incorporating the principles of the present invention is to provide a bottom board 50 that allows VARROA mites to be separated and remain separated from the bees such that the parasitic VARROA mites cannot reattach to the bees. This will include the use of a removable bottom plate that can be accessed with minimal intrusion upon bees entering and exiting the beehive 10.

Figure 3:
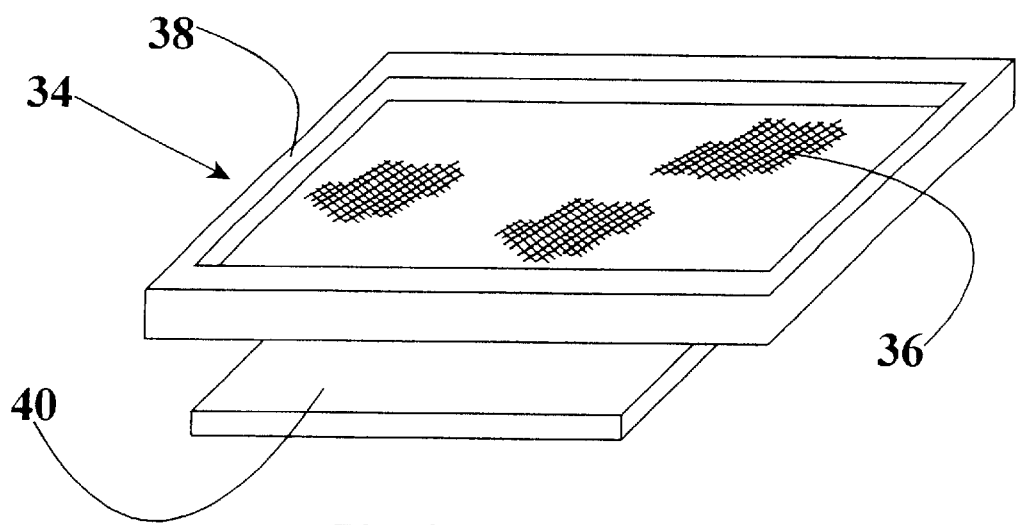
FIG. 3 is a perspective view of a prior art VARROA mite trapping device insert.

A prior art VARROA mite trapping device shown in FIG. 3 comprises an screen insert 34. A fine mesh screen 36 which allows VARROA mites to pass through but does not allow bees to pass through it is mounted within a frame 38. The frame 38 generally comprises a rectangular configuration of boards that is sized such that it slides into the gap 26 between upstanding side walls 20,24 of the prior art bottom board 16. The prior art mite trapping device also includes a mite trapping board 40 which is. positioned beneath the screen insert 34. When properly positioned, the mite trapping board 40 traps mites that fall off bees in the beehive 10 and fall through the fine mesh screen 36. The mite trapping board 40, which may include a sticky substance preventing movement by the mites, ideally separates the parasitic mites from the bees and keeps them separated, thereby preventing the mites that fall off bees from scaling the walls of the beehive 10 and re-infesting the bees therein. A significant disadvantage of the prior art mite trapping device is that many mites will fall off bees and onto the frame 38 around the fine mesh screen 36, and thus do not fall through to the mite trapping board 40. Those mites are free to and do re-infest the bees within the beehive 10. Another disadvantage of the prior art screen insert 34 is that the it is installed in the bottom board 16 of the beehive 10 through gap 26 after removing the entrance reducer 28. This interrupts bees entering and exiting the beehive 10 and, because the user is working in close proximity to the main entry and exit access for the bees, there is an increased risk of being stung. In addition, the intrusion impacts the production by the bees.

Figure 4:
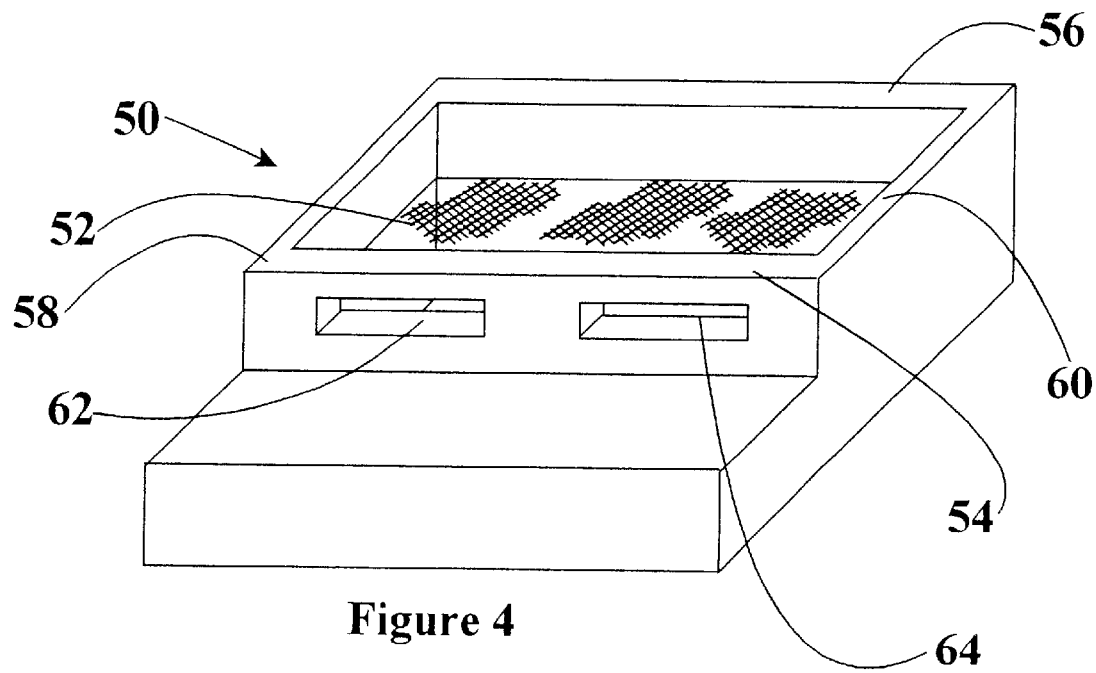
FIG. 4 is a perspective view of the bottom board of the present invention having a permanently installed screen.

The bottom board 50 of the present invention has a fine mesh screen 52 permanently installed therein as shown in FIG. 4. The screen 52 covers the entire area and expanse between upstanding front wall 54, rear wall 56 and side walls 58,60. The bottom board 50 includes a front wall 54 comprising a means for reducing entry and exit into the beehive 10 through slots 62,64. Because the screen 52 is permanently installed below the entry and exit slots 62,64, there is no need to re move the front wall 54 to get access to the interior of bottom board 50, in contrast to the prior art bottom board 16 which necessarily had to provide access to the interior to install and remove the insert screen 34.

Figure 5:
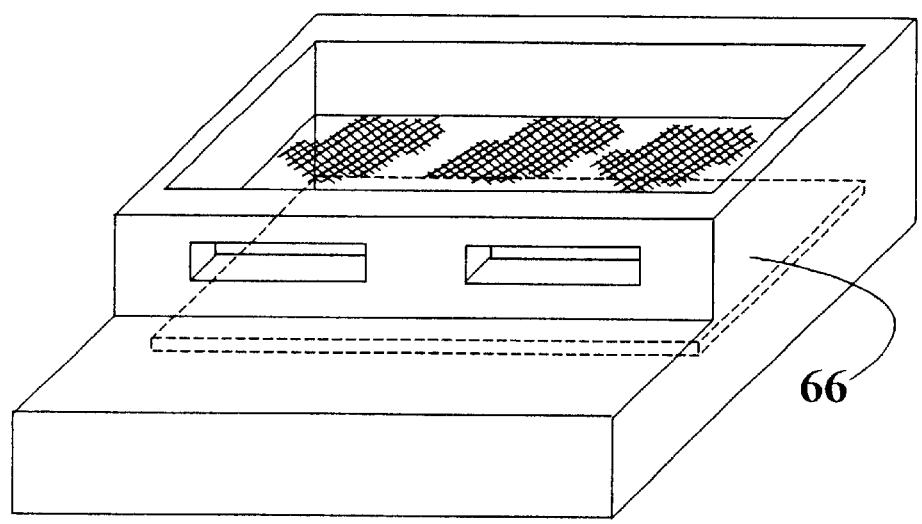
FIG. 5 is a perspective view of the bottom board of the present invention illustrating rear access of the sub-board.
Figure 6:
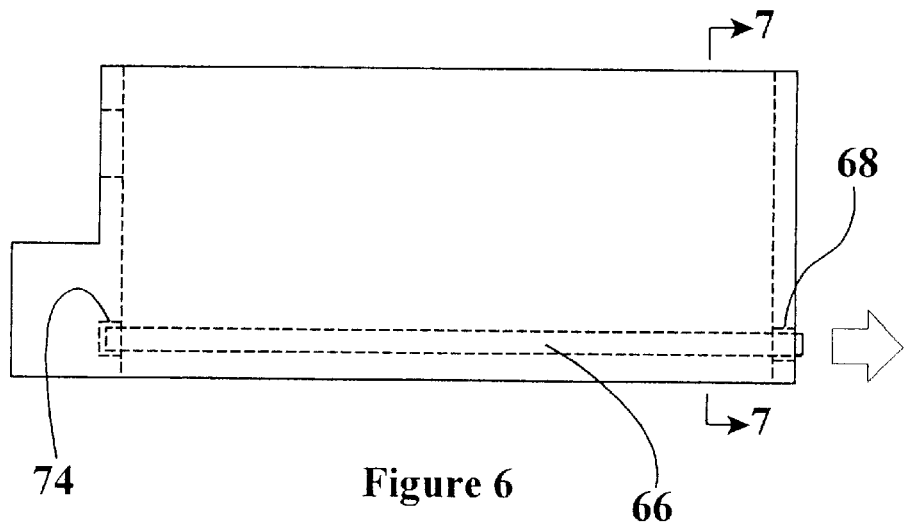
FIG. 6 is a side view of the bottom board of the present invention.
Figure 7:
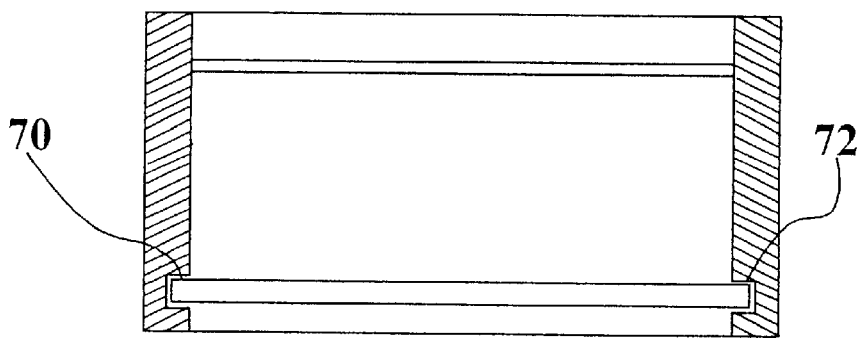
FIG. 7 is a cross-sectional view of the bottom board of the present invention.
Figure 8:
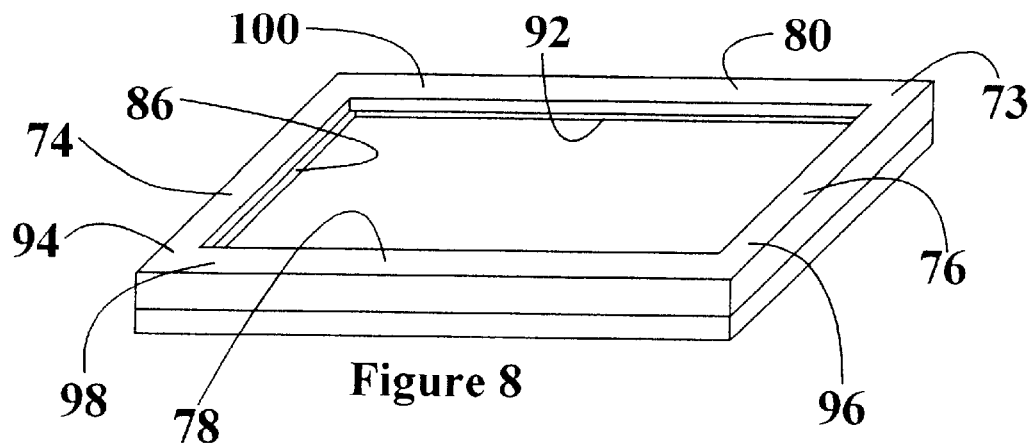
FIG. 8 is a perspective view of the sub-board of the present invention having a perimeter rim.
Figure 9:
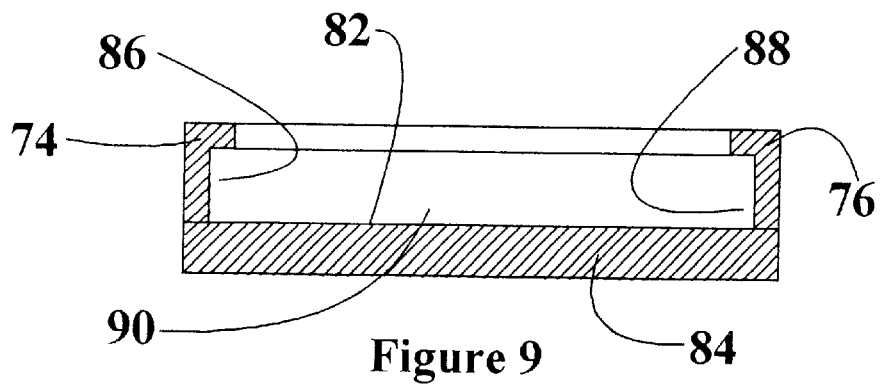
FIG. 9 is a cross-sectional view of the sub-board of the present invention having a perimeter rim.
Figure 10:
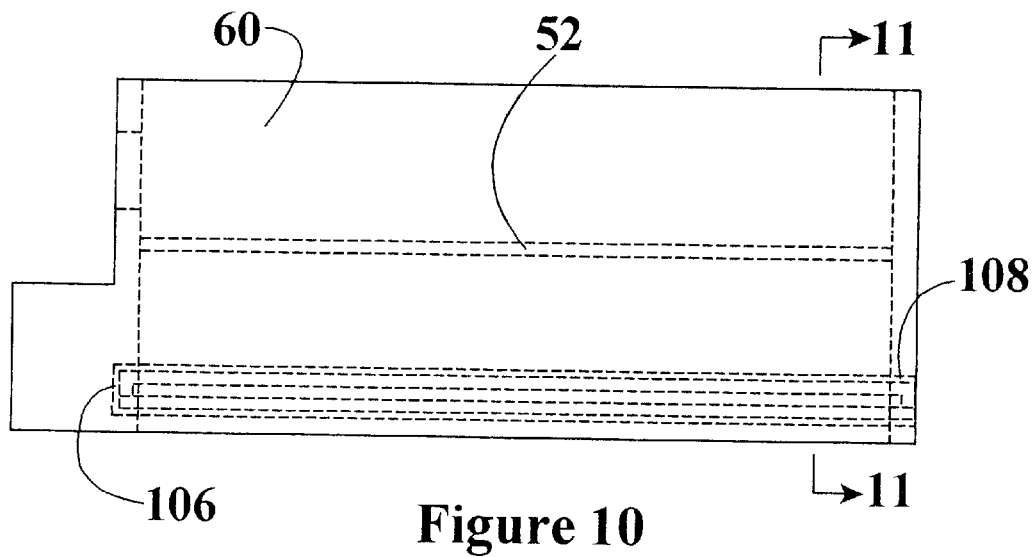
FIG. 10 is a side view of the bottom board of the present invention incorporating the sub-board having a perimeter rim.
Figure 11:
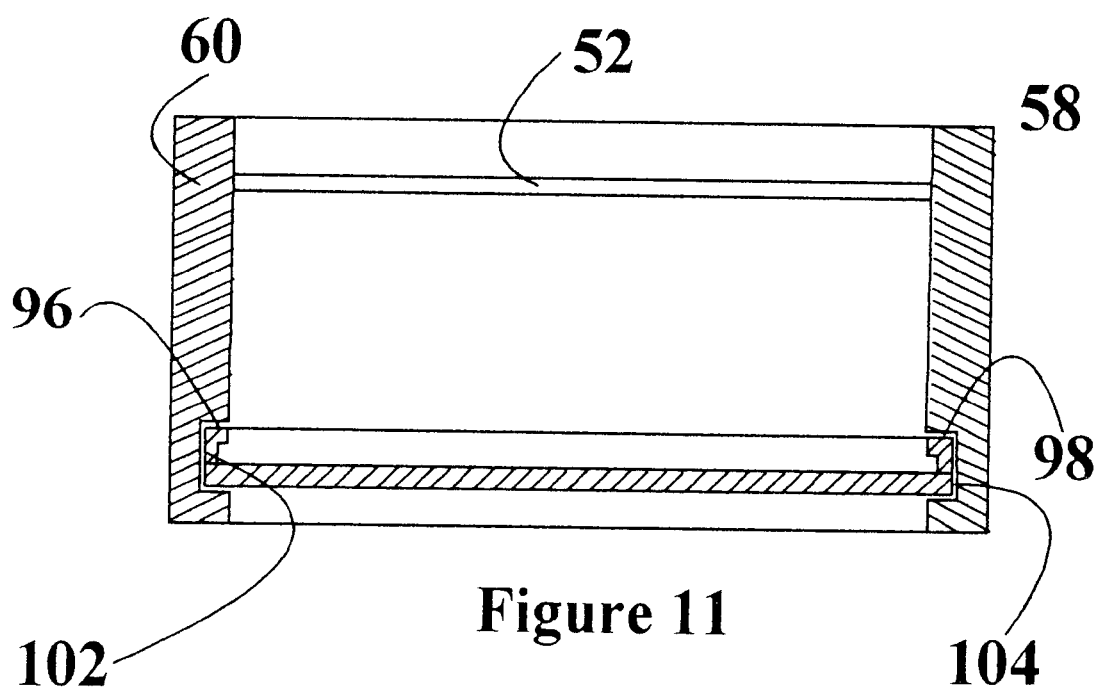
FIG. 11 is a cross-sectional view of the bottom board of the present invention incorporating the sub-board having a perimeter rim.

The screen 52 of the present invention allows small parasitic VARROA mites to fall through while preventing bees from passing therethrough. In order to remove the VARROA mites or other parasites or debris falling through the screen 52, it is desirable to provide means for removing the sub-board 66 onto which VARROA mites and other parasites and debris that fall through the screen 52 land. In a significant advantage of the present invention, this is done, as shown in FIG. 5, by providing a rear access means for removing the sub-board 66 at a location opposite or sufficiently distant from the location at which bees enter and exit the beehive 10, in order that mites and other parasites and debris thereon may be removed without interrupting or intruding upon the entrance and exit of the bees, which occur at slots 62, 64 in the most preferred embodiment. Particularly for beehive hobbyists, including many children, this is a significant advantage because it reduces the incidence of exposure to the bees and the likelihood of being stung.

Rear access to remove and replace the sub-board 66 is provided through sub-board entry slot 68 formed in the rear wall 56 and sub-board receiving slots 70,72 that run the length of the side walls 58,60. Sub-board receiving slot 74 may be provided in front wall 54, although it is not a necessary element of the preferred embodiment.

The sub-board 66 is thus inserted and removed through entry slot 68 in the rear wall 56 and slides within slots 70,72 in the side walls 58,60. Providing this rear access means to insert and remove the sub-board 66 allows a user to remove VARROA mites from the beehive 10 without interfering with bees entry and exit into the beehive 10 through front wall slots 62, 64.

As discussed above, it is known in the prior art to use a trapping substance on a mite trapping board 40 so that, when mites contact the trapping board 40, they stick to the trapping board 40 and cannot move, thereby preventing re-attachment or re-infestation of the bees. One example of such a trapping substance is vaseline, although other substances may be used without departing from the principles of the present invention. The use of a trapping substance on the sub-board 66 of the present invention is specifically, contemplated so that sub-board 66 comprises a sticky sub-board 66. However, even with a trapping substance applied to create the sticky sub-board 66, there is still a danger that mites that land on debris that has previously fallen onto the sticky sub-board 66 and covered the trapping substance, such that mites under some conditions can move to the edge of the sticky sub-board 66 where they then can scale the walls 54,56, 58,60 and go back up through the screen 52 and re-attach and re-infest the bees in the beehive 10.

To prevent the re-attachment of the mites to the bees after the mites have fallen onto the sticky sub-board 66, the present invention provides perimeter enclosing means on the sticky sub-board 66. Rather than merely comprising a flat board on which a trapping substance is applied, such as sticky sub-board 66, a preferred embodiment of the present invention comprises a perimeter rim 73 formed by a front notched member 78, side notched members 74, 76 and a rear notched member 80. The notched members 74,76,78,80 are L-shaped and are affixed to the upper side 82 of a sticky sub-board 84. The notched members 74,76,78,80 include notches 86,88,90,92 which form a perimeter around the top of the sticky sub-board 82. The notches 86,88,90,92 are filled with the same sticky trapping substance used to coat the sticky sub-board 84, an unbridgable gap is created that prevents mites that have fallen through the screen 52 from scaling the side walls 58,60 and thereby prevents re-attachment of the mites to the bees and eliminates the danger of re-infestation. The top surfaces 94,96,98,100 of the notched members 86,88,90,92 are sized so that they extend only to the inside surface of the upstanding front wall 54, rear wall 56, and side walls 58,60 so that mites that fall through the screen 52 fall all the way to the sticky sub-board surface 82. It is an imperative and necessary element of the present invention that the perimeter notched members 74,76,78,80 are recessed under the upstanding walls 54,56,58,60 of the bottom board 50 so that no safe landing surface is available that the mites that fall off of bees can land on from which the mites could scale the walls 54,56,58,60 and re-infest by re-attaching to the bees. To accommodate the sticky sub-board 82 having notched members 74,76,78,80 affixed thereto, slots 102,104 are provided in the side walls 58,60 and a slot 106 is also provided in the front wall 54 to allow easy installation and removal of the sticky sub-board 81. The slots 102,104,106 are sufficiently deep to accommodate the installation and removal of the sticky sub-board 81 having perimeter notched members 74,76,78,80 affixed thereto, which differs from another preferred embodiment of the present invention wherein a sticky sub-board 66 is used without perimeter notched members wherein the receiving slots 70,72,74 must only accommodate the sticky sub-board 66. As with other embodiments of the present invention, the sticky sub-board 81 is removed through rear access means provided by rear slot 108 formed in the rear wall 56 and side slots 102,104 formed in the side walls 58,60.

I claim:

1. A beehive comprising:
   a bottom board comprising upstanding walls; and
   a screen permanently installed in said bottom board wherein said screen covers the entire expanse between said upstanding walls there being such that there is no rim or framework on said bottom board onto which mites can land from which the mites can scale said upstanding walls and re-infest bees in said beehive.

2. The beehive as set forth in claim 1 further comprising:
   a removable sub-board; and
   rear access means located sufficiently distant from a location at which bees enter and exit said beehive to remove said removable sub-board without intruding upon the entrance and exit of the bees.

3. The beehive as set forth in claim 2 wherein said rear access means comprises a sub-board entry slot at a location opposite to that at which bees enter said beehive.

4. The beehive as set forth in claim 3 wherein said bottom board further comprises a front wall having bee entry slots therein, a rear wall and two side walls and said rear access means further comprises sub-board receiving slots in said side walls.

5. The beehive as set forth in claim 4 wherein said sub-board comprises a sticky sub-board.

6. A beehive comprising:
   a bottom board; and
   a removable sticky sub-board having a perimeter enclosing means preventing re-attachment of mites to bees, said removable sticky sub-board comprising an unbridgable gap of a sticky trapping substance forming a perimeter around said sticky sub-board.

7. The beehive as set forth in claim 6 wherein said perimeter enclosing means is formed by a perimeter rim comprising a front member, two side members, and a rear member.

8. The beehive as set forth in claim 7 wherein said bottom board further comprises upstanding walls and said beehive further comprises a screen permanently installed in said bottom board, said screen covering the entire expanse between said upstanding walls.

9. The beehive as set forth in claim 8 wherein said upstanding walls further comprise a front wall having bee entry slots therein, a rear wall and two side walls.

10. The beehive as set forth in claim 9 further comprising rear access means to remove said sticky sub-board.

11. The beehive as set forth in claim 10 wherein said rear access means further comprises a rear slot in said rear wall.

12. The beehive as set forth in claim 11 wherein said perimeter enclosing means further comprises notched members.

* * * * *